US006358302B1

(12) United States Patent
Deng et al.

(10) Patent No.: US 6,358,302 B1
(45) Date of Patent: Mar. 19, 2002

(54) PURIFICATION OF GASES USING MULTI-COMPOSITE ADSORBENT

(75) Inventors: Shuguang Deng, Somerville, NJ (US); Ravi Kumar, Allentown, PA (US); Rudolph J. Wolf, North Plainfield; Mark J. Andrecovich, Somerville, both of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/442,840

(22) Filed: Nov. 18, 1999

(51) Int. Cl.[7] .............................................. B01D 53/047
(52) U.S. Cl. .............................. 95/96; 95/117; 95/128; 95/139; 95/143; 95/902
(58) Field of Search ...................... 95/96–106, 117–129, 95/137–139, 143–145, 900, 902

(56) References Cited

U.S. PATENT DOCUMENTS

| | | | | |
|---|---|---|---|---|
| 4,153,429 A | | 5/1979 | Matthews et al. .............. 55/68 |
| 4,711,645 A | | 12/1987 | Kumar ........................... 55/26 |
| 4,795,735 A | * | 1/1989 | Liu et al. .................. 95/139 X |
| 5,156,657 A | | 10/1992 | Jain et al. ................. 95/139 X |
| 5,232,474 A | | 8/1993 | Jain .......................... 95/139 X |
| 5,451,248 A | * | 9/1995 | Sadkowski et al. ........ 95/139 X |
| 5,531,808 A | | 7/1996 | Ojo et al. ................. 95/101 X |
| 5,560,763 A | | 10/1996 | Kumar ........................... 95/98 |
| 5,571,309 A | * | 11/1996 | Kumar ..................... 95/139 X |
| 5,779,767 A | | 7/1998 | Golden et al. ................. 95/96 |
| 5,855,650 A | * | 1/1999 | Kalbassi et al. .......... 95/139 X |
| 5,906,675 A | * | 5/1999 | Jain et al. ................. 95/143 X |
| 5,914,455 A | * | 6/1999 | Jain et al. ................. 95/143 X |
| 5,989,313 A | * | 11/1999 | Mize ........................ 95/143 X |
| 6,027,548 A | * | 2/2000 | Ackley et al. ............. 95/145 X |
| 6,074,459 A | * | 6/2000 | Gingrich et al. .......... 95/143 X |
| 6,106,593 A | * | 8/2000 | Golden et al. ............. 95/144 X |

FOREIGN PATENT DOCUMENTS

| | | |
|---|---|---|
| EP | 0 862 938 A1 | 9/1998 |
| EP | 0 904 825 A2 | 3/1999 |

OTHER PUBLICATIONS

M. A. Kalbassi and T. C. Golden, "Advanced Pressure Swing Adsorption (PSA) Air Purification Systems", pp. 159–173; International Institute of Referigeration, Munich Meeting On Air Separation Technology (Must '96), Oct. 10–12, 1996.

* cited by examiner

*Primary Examiner*—Robert H. Spitzer
(74) *Attorney, Agent, or Firm*—Philip H. Von Neida; Salvatore P. Pace

(57) ABSTRACT

The present invention provides for a multi-composite adsorbent mixture which will remove $H_2O$, $CO_2$ and nitrogen oxides and/or hydrocarbons from a feed gas stream. The improvement lies in the use of a third adsorbent which is selective for nitrogen oxides, hydrocarbons or both.

9 Claims, No Drawings

PURIFICATION OF GASES USING MULTI-COMPOSITE ADSORBENT

FIELD OF THE INVENTION

The present invention provides for a process for separating components of a gas stream. More particularly, the present invention is directed to multi-composite adsorbents for the removal of contaminants such as $H_2O$, $CO_2$, oxides of nitrogen, hydrocarbons and other trace impurities from feed gas streams.

BACKGROUND OF THE INVENTION

Conventional air separation units (ASUs) for the production of nitrogen and oxygen by the cryogenic separation of air are basically comprised of two integrated distillation columns which operate at very low temperatures. Due to the extremely low temperatures, it is essential that water vapor and carbon dioxide be removed from the compressed air feed to an ASU. If this is not done, the low temperature sections of the ASU will freeze up making it necessary to halt production and warm the clogged sections to revaporize and remove the offending solid mass of frozen gases. This can be very costly. It is generally recognized that, in order to prevent freeze up of an ASU, the content of water vapor and carbon dioxide in the compressed air feed stream must be less than 0.1 ppm and 1.0 ppm, respectively.

A process and apparatus for the pre-purification of air must have the capacity to constantly meet, and hopefully exceed, the above levels of contamination and must do so in an efficient manner. This is particularly significant since the cost of the pre-purification is added directly to the cost of the product gases of the ASU.

Current commercial methods for the pre-purification of air include reversing heat exchangers, temperature swing adsorption and pressure swing adsorption.

Reversing heat exchangers remove water vapor and carbon dioxide by alternately freezing and evaporating them in their passages. Such systems require a large amount, typically 50% or more, of product gas for the cleaning, i.e. regenerating, of their passages. Therefore, product yield is limited to about 50% of feed. As a result of this significant disadvantage, combined with characteristic mechanical and noise problems, the use of reversing heat exchangers as a means of pre-purification has steadily declined over recent years.

In temperature swing adsorption (TSA) pre-purification, the impurities are removed at low temperature, typically at about 5–15° C., and regeneration is carried out at elevated temperatures, e.g. from about 150°–250° C. The amount of product gas required for regeneration is typically only about 10%–25%, a considerable improvement over reversing heat exchangers. However, TSA processes require evaporative cooling or refrigeration units to chill the feed gas and heating units to heat the regeneration gas. They are, therefore, disadvantageous both in terms of capital costs and energy consumption.

Pressure swing adsorption (PSA) processes are an attractive alternative to TSA, since both adsorption and regeneration are carried out at ambient temperature. PSA processes, in general, do require substantially more regeneration gas than TSA. This can be disadvantageous when high recovery of cryogenically separated products is required. When a PSA air pre-purification unit is coupled to a cryogenic ASU plant, a waste stream from the cryogenic section which is close to ambient pressure is used as purge for regenerating the beds.

Feed air is passed under pressure through a layer of activated alumina particles to remove the bulk of water vapor and carbon dioxide and then through a layer of 13X zeolite particles to remove the remaining low concentrations of carbon dioxide and water vapor. Arrangement of the adsorbent layers in this manner is claimed to increase the temperature effects, i.e. temperature drop during desorption, in the PSA beds. In other configurations only activated alumina is used to remove both water vapor and carbon dioxide from feed air. This arrangement is claimed to reduce the temperature effects.

It will be appreciated that, although many pre-purification methodologies based on PSA have been proposed, in the literature, few are actually being used commercially due to high capital costs associated therewith.

In general, known PSA pre-purification processes require a minimum of 25%, typically 40–50%, of the feed as purge gas. As a result of having low sieve specific product, such processes have high capital cost. Reduction in the air pre-purification system capital cost is particularly important when a large plant is contemplated. Therefore, it will be readily appreciated that, for large plants, improvements in pre-purification system operation can result in considerable cost savings.

In addition the current PSA systems fail to remove substantially oxides of nitrogen and some of the hydrocarbons.

SUMMARY OF THE INVENTION

The present invention provides a multi-composite adsorbent for removing gaseous impurities from feed gas streams in either pressure swing adsorption (PSA) or thermal swing adsorption (TSA) processes. The multi-composite adsorbent is a mixture of adsorbents which have different functionalities such that the $H_2O$, $CO_2$, nitrogen oxides, hydrocarbons and other trace impurities can be selectively adsorbed from the gas stream.

The multi-composite adsorbent comprises one $H_2O$ vapor removal adsorbent, one $CO_2$ removal adsorbent, and a third adsorbent which can selectively adsorb hydrocarbons and/or nitrogen oxides. The multi-composite adsorbent offers several advantages over multi-layered or single layer zeolite, or activated alumina beds: uniform distribution of each adsorbent along the bed to achieve maximum adsorbent performance; uniform temperature distribution to avoid "cold/hot spot" problems and maintain stable performance; potential synergies amongst different adsorbents; and lower costs to operate than a multi-layer bed.

DESCRIPTION OF THE RELATED ART

U.S. Pat. No. 5,779,767 teaches a mixed adsorbent of alumina and zeolite which can remove $CO_2$ and $H_2O$ from gas streams. The two-component mixture also demonstrates some efficacy at adsorbing acetylene and nitrogen oxides.

EP 0 862 938 A1 teaches the removal of nitrogen oxides, water and carbon dioxide from gas streams by passing the gas stream through an alumina adsorbent and a zeolite adsorbent in a pressure swing adsorption process. The PSA bed uses an initial layer of alumina adsorbent followed by the zeolite adsorbent layer.

DETAILED DESCRIPTION OF THE INVENTION

The present invention provides for a process for the adsorption of contaminating gas components from a feed gas stream by contacting the feed gas with a multi-composite adsorbent comprising a mixture of a $CO_2$ adsorbent and an $H_2$ adsorbent, the improvement further comprising including a nitrogen oxide and/or hydrocarbon adsorbent in the mixture.

The multi-composite adsorbents are employed in either pressure swing adsorption (PSA) or thermal swing adsorption (TSA) processes. These processes are typically used for removing $CO_2$ and $H_2O$ from compressed air prior to its cryogenic distillation in air separation units (ASU).

The multi-composite adsorbent is a mixture of adsorbent materials that are selected for their specialty towards one or more gaseous contaminants. The carbon dioxide adsorbent has a high $CO_2$ capacity and is selected from the group consisting of zeolite types A, X and Y; ZSM-5, polymeric and organometallic adsorbents.

The water adsorbent is selected from the group consisting of activated alumina, silica gel and non-zeolite desiccants.

The adsorbent for hydrocarbons and nitrogen oxides should have a high adsorption capacity for both of these species and is selected from the group consisting of zeolite type A and Y, activated carbon, organometallic adsorbents and other non-zeolite, non-activated alumina adsorbents.

Additionally, in another embodiment of the present invention, another adsorbent may be added to this mixture to remove trace impurities that are not nitrogen oxides or hydrocarbons such as ammonia and sulfur oxides.

Polymeric adsorbents are highly cross-linked polymer matrix with uniform pore size distribution, large surface area and pore volume, and a high capacity for organic compounds. Organometallic adsorbents are microporous organic/inorganic complex polymers that usually contain a metal or metalloid bonded directly to a carbon atom, and have a high adsorption capacity for both organic and inorganic compounds.

The nitrogen oxides that are treated by the improvements of the present invention are selected from the group consisting of $NO$, $NO_2$, $N_2O$, $N_2O_3$, $N_2O_4$, $N_2O_5$ and mixtures thereof.

The hydrocarbons that are removed by the multi-composite adsorbent mixture are selected from the group consisting of $CH_4$, $C_2H_2$, $C_2H_4$, $C_2H_6$, $C_3H_6$, $C_3H_8$, $C_4H_{10}$ and mixtures thereof.

The multi-composite adsorbent may be formed by any procedure known to those skilled in the art. Typically, the mixture is obtained by combining the three or more adsorbent materials. This combination effect will help to eliminate problems associated with multilayer adsorbent beds. For example, adsorbent bed configuration can become complicated due to several adsorbent layers. Different degrees of air adsorption on different adsorbent layers cause a "cold/hot" spot in the bed which reduces overall performance. Excessive amounts of adsorbent may be necessary due to fluid flow maldistribution. Further, the mixture increases the effective amount of effective adsorbent material in the bed which reduces overall costs. Additionally, only one binder in a fixed amount is needed in the mixture as opposed to different binders in different amounts used in the different layers of multilayer beds.

In the practice of the present invention, the adsorbent mixture may comprise, by weight, from about 5 to about 95% of $H_2O$ adsorbent; from about 5 to about 95% $CO_2$ adsorbent; and about 5 to about 95% nitrogen oxide/hydrocarbon adsorbent, as long as the total weight is 100%. The preferred adsorbent for $H_2O$ is activated alumina. The preferred adsorbent for $CO_2$ is 13X zeolite. Lastly, the preferred adsorbent for the nitrogen oxides/hydrocarbon is selected from type 5A zeolite.

In an alternative embodiment of the present invention, a dual layer bed arrangement is employed. The first layer (at feed end) will remove water and is selected from any applicable water adsorbent such as activated alumina. The second layer (at product end) will be composed of the mixture and will be responsible for removing carbon dioxide and the nitrogen oxides and hydrocarbon contaminants.

The invention will be further illustrated with regards to the following examples which are exemplary and should not be construed as limiting the invention.

EXAMPLES

Example 1

In a comparative example, PSA PPU experiments were conducted in a 2-Bed PSA unit (5.30 inches in diameter and 83.5 inches in height). The bed was packed with Alcoa H-156 which is a composite of 40% 4A and 60% AA up to a height of 83.5 inches. Table 1 lists the experimental conditions.

TABLE 1

| | |
|---|---|
| Feed Step: | 24 minutes, feed pressure of 80.5 psia, feed temperature of 55° C., air flow rate of 18.0 scfm |
| Vent Step: | 1 minute |
| Purge Step: | 18 minutes, purge gas pressure of 15.3 psia, purge gas temperature of 55° C. and purge gas ($N_2$) flow rate of 11.8 scfm |
| Re-Pressurization Step: | 5 minutes with N2 from top of the bed |

Trace components $N_2O$, $C_2H_2$, $C_2H_4$, $C_2H_6$, $C_3H_6$, $C_3H_8$, and n-$C_4H_{10}$ injected into the moisture saturated feed air which also contains about 350 ppm of $CO_2$ and 2 ppm of $CH_4$. An FT-IR analyzer was used to measure the feed and product concentrations for all trace components, an IR analyzer to determine $CO_2$ concentration, and a hygrometer for water vapor concentrations measurement. Table 2 summarizes the feed and product concentrations measured during feed step after cyclic state was established. The results summarized in Table 2 clearly show that water vapor, $CO_2$ and $C_2H_2$ are effectively removed but all other trace impurities including $N_2O$ and $C_3H_8$ are only partially removed by the composite (i.e., AA+4A) adsorbent, in the PSA PPU cycles.

TABLE 2

|  | $H_2O$ | $CO_2$ | $N_2O$ | $CH_4$ | $C_2H_2$ | $C_2H_4$ | $C_2H_6$ | $C_3H_6$ | $C_3H_8$ | $nC_4H_{10}$ |
|---|---|---|---|---|---|---|---|---|---|---|
| Feed (ppm) | >10000 | 361.3 | 0.946 | 2.371 | 0.750 | 2.921 | 2.120 | 1.0535 | 2.860 | 1.839 |
| Product, (Ave., ppm) | ND | ND | 0.407 | 1.923 | 0.022 | 1.863 | 2.134 | 0.562 | 2.487 | 0.327 |
| Removal | 100% | 100% | 57% | 19% | 97% | 36% | 0% | 47% | 13% | 82% |

Example 2

5 ppm $C_3H_8$ in feed air was not removed in a PSA PPU process using activated alumina adsorbent bed. However, 6 inch layer of zeolite 5A on top of 56 inches activated alumina reduced propane level to below the detection limit (0.05 ppm) in the same application at similar operating conditions. It is therefore expected that a composite AA+5A adsorbent will remove the hydrocarbon propane from air along with $H_2O$ and $CO_2$.

Example 3

A composite adsorbent containing 55 wt. % activated alumina, 20 wt. % 13X, 10 wt. % zeolite 5A and 15 wt. % binder was prepared and calcined at 580° C. PSA PPU experiments were carried out on this composite adsorbent in a single bed PSA PPU unit of 2.15 inches in diameter and 91 inches in height. 86 inches of the composite adsorbent was packed in the bed. Cyclic experiments at conditions described in Table 3 were performed.

Trace components $N_2O$, $C_2H_2$, $C_2H_4$, $C_2H_6$, $C_3H_6$, $C_3H_8$, and n-$C_4H_{10}$ injected into the moisture saturated feed air which also contains about 350 ppm of $CO_2$ and 2 ppm of $CH_4$. An FT-IR analyzer was used to measure the feed and product concentrations for all trace components, an IR analyzer to determine $CO_2$ concentration, and a hygrometer for water vapor concentrations measurement. Table 4 summarizes the trace concentrations in both feed and product. As shown in the table all trace components except $CH_4$ and $C_2H_6$ were completely removed along with $CO_2$ and moisture. This demonstrates the significant improvement of 5A/13X/AA composite adsorbent over adsorbent H-156 (4A+AA) as described in Example 1 in terms of high $CO_2$ working capacity and ability for other trace removal.

TABLE 3

| Feed Step: | 24 minutes, feed pressure of 80.5 psia, feed temperature of 25° C., air flow rate at 110 slpm |
|---|---|
| Vent Step: | 1 minute |
| Purge Step: | 18 minutes, purge gas pressure of 23.5 psia, purge gas temperature of 25° C., and purge gas ($N_2$) flow rate of 100 slpm |
| Re-pressurization Step: | 5 minutes with $N_2$ from top of the bed |

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A pressure swing adsorption process for the removal of contaminants from a feed gas stream by contacting said feed gas stream with a multi-composite adsorbent comprising a mixture of a first zeolite selected from the group consisting of zeolite types X and Y; and activated alumina, the improvement consisting of including in said mixture a second zeolite which is different from said first zeolite and is not a type X or Y zeolite.

2. The process as claimed in claim 1 wherein said feed gas stream is air.

3. The process as claimed in claim 1 wherein said first zeolite is zeolite 13X.

4. The process as claimed in claim 1 wherein said second zeolite is zeolite 5A.

5. The process as claimed in claim 1 wherein said contaminants are nitrogen oxides selected from the group consisting of NO, $NO_2$, $N_2O$, $N_2O_3$, $N_2O_4$, $N_2O_5$ and mixtures thereof.

6. The process as claimed in claim 1 wherein said contaminants are hydrocarbons selected from the group consisting of $CH_4$, $C_2H_2$, $C_2H_4$, $C_2H_6$, $C_3H_6$, $C_3H_8$, $C_4H_{10}$ and mixtures thereof.

7. The process as claimed in claim 1 wherein said mixture comprises, by weight, from about 5% to about 95% zeolite 13X; from about 5% to about 95% activated alumina and from about 5 to about 95% zeolite 5A, wherein the total equals 100%.

8. The process as claimed in claim 1 wherein said contaminants are selected from the group consisting of water and carbon dioxide.

9. A pressure swing adsorption process for the removal of contaminants from a feed gas stream by contacting said feed gas stream with a multi-composite mixture comprising a mixture of activated alumina, zeolite 13X, and zeolite 5A.

TABLE 4

|  | $H_2O$ | $CO_2$ | $N_2O$ | $CH_4$ | $C_2H_2$ | $C_2H_4$ | $C_2H_6$ | $C_3H_6$ | $C_3H_8$ | $nC_4H_{10}$ |
|---|---|---|---|---|---|---|---|---|---|---|
| Feed (ppm) | ~6500 | 359.0 | 0.989 | 2.300 | 0.836 | 3.260 | 2.481 | 1.257 | 3.290 | 3.051 |
| Product (Ave., ppm) | ND | ND | ND | 1.800 | ND | 0.076 | 1.556 | 0.039 | 0.016 | 0.0074 |
| Removal | 100.0% | 100.0% | 100% | 20% | 100% | 98% | 37% | 97% | 99.5% | 99.8% |

\* \* \* \* \*